United States Patent

Donohue et al.

[15] 3,653,011

[45] Mar. 28, 1972

[54] THREE POLE TIP READ AFTER WRITE TRANSDUCER

[72] Inventors: James P. Donohue, Fairborn; Donald A. Bange, Dayton, both of Ohio; John J. Miyata, Monterey Park, Calif.

[73] Assignee: The National Cash Register Company, Dayton, Ohio

[22] Filed: Apr. 15, 1970

[21] Appl. No.: 28,873

[52] U.S. Cl. ................................340/174.1 B, 340/173.1 H

[51] Int. Cl. ...................G11b 5/22, G11b 5/46, G11b 27/36

[58] Field of Search .............340/174.1 B, 174.1 F, 174.1 H; 179/100.2 C

[56] References Cited

UNITED STATES PATENTS

| | | | |
|---|---|---|---|
| 3,502,821 | 3/1970 | Duinker | 340/174.1 F |
| 3,359,548 | 12/1967 | Yoshii et al. | 340/174.1 B |
| 3,150,358 | 9/1964 | Newman et al. | 340/174.1 F |
| 3,535,704 | 10/1970 | Ault | 340/174.1 B |
| 3,510,857 | 5/1970 | Kennedy et al. | 340/174.1 |
| 3,854,524 | 9/1958 | Went et al. | 179/100.2 C |
| 3,678,972 | 5/1954 | Spears | 179/100.2 C |

*Primary Examiner*—Bernard Konick
*Assistant Examiner*—Vincent P. Canney
*Attorney*—Louis A. Kline, John J. Callahan and Harry W. Barron

[57] ABSTRACT

A magnetic recording head is provided with a pair of pole tips separated by a high-reluctance gap, and the pole tips are coupled together by a low-reluctance path. The head is further provided with a third pole tip. A magnetic medium, such as a tape, is passed over the head in such a manner that any point on the medium passes over the gap and thereafter over the third pole tip. A pair of coils are wound around the low-reluctance coupling path, one of which is used to cause a magnetic field to exist in the gap and thereby be applied to the medium, and the other of which is used to detect any change in the direction of the magnetic field on the medium as it passes in the vicinity of the third pole tip. Means are further provided to determine whether the signal provided by the detecting coil corresponds to an expected signal.

10 Claims, 6 Drawing Figures

INVENTORS
JAMES P. DONOHUE
DONALD A. BANGE &
JOHN J. MIYATA

BY Louis A. Kline
John J. Callahan
Harry W. Barron
THEIR ATTORNEYS

INVENTORS
JAMES P. DONOHUE
DONALD A. BANGE &
JOHN J. MIYATA

BY Louis A Klive
John J. Callahan
Harry W Barron
THEIR ATTORNEYS

INVENTORS
JAMES P. DONOHUE
DONALD A. BANGE &
JOHN J. MIYATA

BY Louis A Kline
John J. Callahan
Harry W Barron
THEIR ATTORNEYS

INVENTORS
JAMES P. DONOHUE
DONALD A. BANGE &
JOHN J. MIYATA

BY Louis A. Kline
John J. Callahan
Harry W. Barron
THEIR ATTORNEYS

THREE POLE TIP READ AFTER WRITE TRANSDUCER

This invention relates to magnetic heads and more particularly to a single-gap magnetic recording and reproducing head which first records a signal on a magnetic medium and thereafter reproduces that recorded signal.

In a magnetic recording system, a medium, such as an iron-oxide-coated tape, disc, or drum, is passed over a magnetic recording head, and digital information is recorded on the medium. A typical recording head would include a low reluctance U-shaped element which has a pair of pole tips separated by a high-reluctance gap. There would be a coil wound around the low-reluctance element which, in response to a current applied thereto, would cause a magnetic field to exist in the gap. The direction of this gap field would be determined by the direction of the current flowing through the coil. The direction of the current flow, in turn, would be determined by the particular bit of information being recorded.

The medium, hereinafter referred to simply as a tape, is repetitiously moved and stopped as it traverses over the head in a given direction. The amount the tape is moved between each step is less than the distance between the gap pole tips, but more than half this gap distance. Current will be periodically applied to the coil so that the gap field for recording can only exist during the time the tape is stopped. The relationship between the direction of tape movement and the gap field will be such that the field will either be in the same direction as the tape movement or in a direction opposite to the tape movement. The intensity of the gap field will be such that the fringing of the gap field will be sufficient to cause a magnetically saturated condition to exist on that portion of the tape directly above the gap. In this manner, individual and adjacent increments of the tape can become magnetically saturated, or in other words, the tape can be thought of as being a plurality of individual bar magnets all coupled together. The direction of the magnetic field provided by each increment will be determined by the direction of the gap field at the time that particular increment was positioned over the gap.

At the junction of any two adjacent increments of the tape, there will be either a pair of north poles, a pair of south poles, a north and a south pole, or a south and a north pole depending in the direction of the field produced by each of the two increments forming the junction. The cases where there are a north and a south pole or a south and a north pole at the junction will represent a binary 0 and the cases where there are two north poles or two south poles at the junction will represent a binary 1. Thus when one wishes to record a 1 on the tape, the polarity of the current to the head coil will have to be opposite to the polarity used to magnetize the previous increment or if one wishes to record a 0 on the tape, the polarity of the current through the head coil will have to be the same as the polarity of the current used to record the previous increment.

Means will be provided in a utilization device, such as a digital computer, for reading the digital information stored on the tape. However, it will be desirous to be able to check the tape prior to allowing the computer to process it to see if what was recorded on the tape was the data intended to be so recorded, since it is very difficult to recreate data lost, especially if it is one time data. One naturally desires the tape to contain only the correct information prior to its being applied to the computer. A logical time to perform this check is shortly after the information is recorded on the tape since at this time the actual input data may still be available to check the recorded data against.

One way to achieving this check is to provide two separate heads with a gap in each head. The first head operates as described above to record the information on the tape. The tape is then passed across the second head so that the previously recorded fields on the tape appear in the gap of the second head. The field in the second head gap causes a flux to be induced in the second head and a winding around the low-reluctance path of the second head will sense any directional change in the field in the second head gap. Means are further provided for translating this sensed field change into the digital code it represents. When no field change is detected, a 0 bit has been recorded and when a field change is detected, a 1 bit has been recorded. A comparator is provided which compares the digital signal sensed by the second head with a digital signal which was to be recorded on the tape.

The problem with this type of a system is that the two gaps are relatively far apart in comparison to the distance separating the bits on the tape. For instance, bits are recorded on the tape at a rate of 200 bits per inch or 0.005 inches apart and the two gaps are separated by between one-fourth inch and several inches. Thus between the gap of the first head and the gap of the second head, there would be at least 50 bits. This in turn requires that the comparator include a 50 bit memory since the bit sensed by the second head occurs 50 bits after the first head recorded that bit. A further disadvantage of this type of approach is that once an error is detected, those 50 bits will have been recorded on the tape prior to the error being corrected. Thus a special coded signal of some sort will have to be recorded on the tape 50 bits after the error to tell the computer of this error. This in turn requires additional computer time to process the code as well as sophisticated logic circuitry to cause the code to be added to the tape without losing any bits. All this in turn adds great expense to the system.

A second approach to checking the bits which are recorded on the tape only utilizes a single head, but it does not check the actual bit recorded. In this approach there are two coils wound around the low-reluctance coupling path of the single head, one of these coils being for recording and the other one being for detecting. Prior to the tape passing the head, it is premagnetized in a certain direction. During the time the tape is stopped over the gap, current is applied to recording coil and a field thereby exists in the gap which is impressed on the tape. During this time a means for detecting the signal at the output of a detecting coil is gated off. Thereafter the recording current is turned off, the detecting means gated on, and the tape begins to move. Prior to the tape leaving the leading pole tip, a flux will be flowing through the low-reluctance coupling path. When the tape first begins to move, this flux due to the tape field will change if the direction of the field above the gap is opposite to the premagnetized field and this change in flux will be detected as a voltage pulse by the detecting coil. If the direction of the field above the gap is the same as the direction of the premagnetized field, this will be detected by the absence of a voltage pulse.

This approach, however, has a disadvantage in that at the position of the actual bit which is recorded is at the junction of two increments which is positioned over the trailing pole tip of the head and thus the actual bit recorded is not checked, but rather, some semblance of that bit which exists over the leading pole tip. To determine if the recorded bit is what was desired, the detected signal must be processed through logic circuitry to determine what the actual bit is. A further disadvantage of this approach is that the gap is generally somewhat larger than the bit spacing on the tape. For instance, the gap may be 0.006 inches in length whereas the bit spacing in the tape is only 0.005 inches in length. Thus, what is being checked at the leading pole tip is not only not the actual bit which was recorded on the tape, but also, a point which will not even have a bit thereat.

In accordance with one preferred embodiment of this invention, there is provided a magnetic head structure which comprises a member having first and second pole tips which are connected together by a low-reluctance path. These two pole tips are separated by a given distance such that a high-reluctance gap exists between the pole tips. There is further provided a third pole tip which is coupled by the low-reluctance path to the first and second pole tips and which further is capable of sensing any change in a magnetic field existing in the vicinity of the third pole tip.

A detailed description of two preferred embodiment of this invention is given hereinafter where reference is made to the following FIGURES in which.

Figure 1:
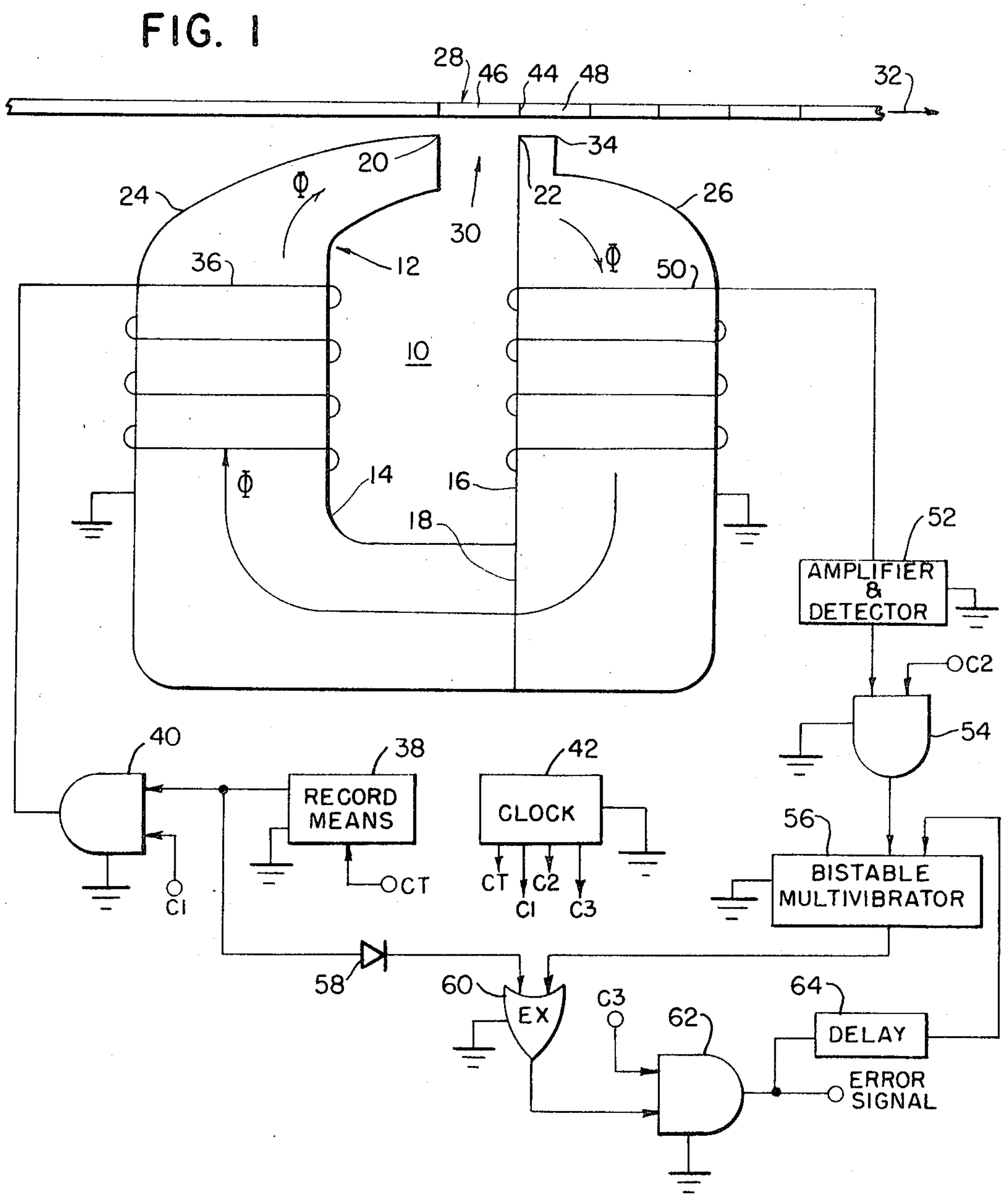
FIG. 1 shows a first preferred embodiment of the invention.

Referring now to FIG. 1, there is shown a magnetic recording and reproducing system 10, which includes a U-shaped magnetic core element 12 of a material such as Hi Mu 80 (a nickel iron alloy) or magnetic ferrite. Element 12 can be composed of two pieces, 14 and 16, each of which are coupled together at junction 18 by a low-reluctance coupling.

Core element 12 has two pole tips 20 and 22 which are coupled together by the low-reluctance path of the remainder of core element 12. As used herein, the term "pole tip" means any change in direction on that portion of the head which is relatively close to where a medium that is capable of being magnetized passes and which is shaped to enhance the effects of any time rate of change in a magnetic field due to said passing medium. The points 24 and 26 on element 12 would not be considered pole tips because they are removed from tape 28 and because they are shaped to degrade the effects of the time rate of change of a magnetic field. In FIG. 1, pole tips 20 and 22 (and 34 to be hereinafter described) are sharp contour changes and points 24 and 26 are gradual contour changes.

Pole tips 20 and 22 are separated by a high-reluctance gap area 30, which may simply be air or a high-reluctance material, such as aluminum. The dimensions of gap area 30 should be slightly greater than the spacing between bits, which are to be recorded on an iron oxide coated magnetic tape 28 which passes across pole tips 20 and 22 and gap 30 in a direction indicated by the arrow 32. For instance, where the bit density on tape 28 is 200 bits per inch, or in other words the bits are 0.005 inches apart, the spacing between pole tips 20 and 22 may be 0.006 inches.

It is seen that any point on tape 30 will pass pole tip 20 prior to passing pole tip 22; thus, hereinafter pole tip 20 will be referred to as the leading pole tip and pole tip 22 will be referred to as the trailing pole tip.

The portion 16 of core element 12 which has trailing pole tip 22 thereon further has reproduce pole tip 34 thereon. In the embodiment shown in FIG. 1, the distance separating trailing pole tip 22 from reproduce pole tip 34 is less than the bit spacing on tape 28. For example, this distance may be 0.002 inches.

The movement of tape 28 across core element 12 is periodic in such a manner that for a portion of one period tape 28 is stationary and for the remainder of that period, tape 28 moves a distance equal to the bit spacing. It is desirous to record a bit on tape 28 during the time tape 28 is stationary by causing a magnetic field to exist in gap 30 of sufficient intensity such that the fringe areas of the gap field can cause the portion of tape 28 which is directly above gap 30 to become magnetically saturated. This recording may be accomplished by including in system 10, a record coil 36 which is wound around portion 14 of core element 12 and a record means 38. Record means 38 provides a voltage between its output and ground which has a polarity dependent upon the value of the bit to be recorded and the polarity of the current provided during the time the previous bit was recorded. More specifically, if a 1 bit is to be recorded, the voltage provided by record means 38 will be opposite in polarity to what it was when the previous bit was recorded (irrespective of whether the previous bit was a 1 or a 0), and if a 0 bit is to be recorded, the voltage provided by record means 38 will be of the same polarity as it was when the previous bit was recorded (irrespective of whether the previous bit was a 1 or a 0). The voltage provided by record means 38 for each bit will last for the entire cycle of one tape movement.

The voltage provided by record means 38 is applied between ground and one of the two inputs of analog AND gate 40 and the output of analog AND gate 40 is applied to one end of coil 36 with the other end thereof being grounded. A clock 42 is also included in system 10 which provides four periodic clock pulse signals herein designated the CT, C1, C2, and C3 clock signals. The time period of each of the clock signals is equal to the time between stops of tape 28. Signal CT has a high value for one-half of the period and during this time, tape 28 moves; signal C1 is high for a portion of the time CT is low; and signals C2 and C3 are high during the time signal CT is high with signal C2 being high prior to signal C3 being high. Signals CT, C1, C2, and C3 are shown in FIGS. 2A, 2B, 2C and 2D respectively. The CT signal is applied to record means 38 and a new bit is read each time a pulse of the CT signal occurs.

The C1 signal is applied to the other input of analog AND gate 40. During the time the C1 signal is high, analog AND gate 40 allows the voltage provided by record means 38 to cause a current to flow through coil 36. This current causes a flux to flow around core element 12 whereby a magnetic field exists in gap 30. The magnetic field in gap 30, hereinafter referred to as the gap field, has fringe areas which extend above and below gap 30 itself and the portion of tape 28 which is over gap 30 will be positioned close enough thereto such that the fringing of the gap field above gap 30 completely surrounds that portion and causes it to become magnetically saturated with a direction the same as that of the gap field.

One manner of recording a binary code on a magnetic tape is to change the direction of the field from what it was when the previous bit was recorded, if a 1 bit is to be recorded, or to maintain the field in its previous direction, if a 0 bit is to be recorded. Thus, where a 1 bit is to be recorded on tape 28, there will either be a sharp change of field direction at or near the junction 44 of the increment 46, which is directly above gap 30, and the increment 48, which, one cycle earlier, was above gap 30, and where a 0 bit is to be recorded on tape 28, there will be no change of field direction at or near junction 44. When tape 28 is fed to a computer (not shown) or other utilization device, it will be the junctions between the field increments, such as junction 44, that will be examined to determine whether a field directional change occurred (1 bit) or not (0 bit). Thus, if one desired to check the recorded information on tape 28, this junction would be a desirable place to check.

This may be accomplished when junction 44 moves past reproduce pole tip 34 during the portion of the cycle when tape 28 moves to the right (as seen in FIG. 1). If there is a change in field direction on tape 28 at junction 44, there will be a change in flux magnitude flowing through core element 12 as junction 44 passes directly over reproduce pole tip 34. This change in flux magnitude will be explained in more detail hereinafter with respect to FIGS. 3A, 3B and 3C. Reproduce coil 50 is wound around portion 16 of core element 12 and it will sense this flux magnitude change by providing a voltage at its output which is proportional to the time derivative of the flux. The output voltage from reproduce coil 50 is applied to a circuit 52 which includes an amplifier, a voltage level detector such as a Schmidt trigger, and monostable multivibrator. Circuit 52 provides a pulse signal whenever the voltage provided by reproduce coil 50 is of a sufficient magnitude to indicate a 1 bit is recorded thereon.

The circuit 52 pulse signal is applied to one input of two input digital AND gate 54 and the C2 clock signal (FIG. 2C) is applied to the second input of AND gate 54. The C2 signal will have a high value between a time shortly before and shortly after junction 44 passes over reproduce pole tip 34, and a low value otherwise. When a circuit 52 pulse and a C2 signal pulse occur simultaneously, a pulse will be applied from AND gate 54 to bistable multivibrator 56 which will cause it to change states.

The output from record means 38 is coupled to the anode of diode 58 and the cathode of diode 58 is coupled to one input of a two input EXCLUSIVE OR gate 60. Diode 58 merely clips the negative voltage portions of the record means 38 output voltage to 0. As is well known, an EXCLUSIVE OR gate will provide a high signal at its output if one, but not both, of its inputs has a high signal applied thereto and a low signal if both of its inputs have either high or low signals applied thereto. The output signal from EXCLUSIVE OR gate 60 is applied to one input of two input digital AND gate 62 and the C3 clock signal is applied to the second input of AND gate 62. The C3 signal is high for at least a portion of the time between the leading edge of the C2 pulse and the leading edge of the next CT pulse. Whenever the signal at the output of AND gate 62 becomes high, a recording error is indicated and this high signal may be used to correct any misrecordings on tape 28. The signal at the output of AND gate 62 is also applied through delay circuit 64 to bistable multivibrator to cause it to change states. Delay circuit 64 delays this signal by an amount less than the duration of a pulse of signal C3.

Figures 3A, 3B, 3C:
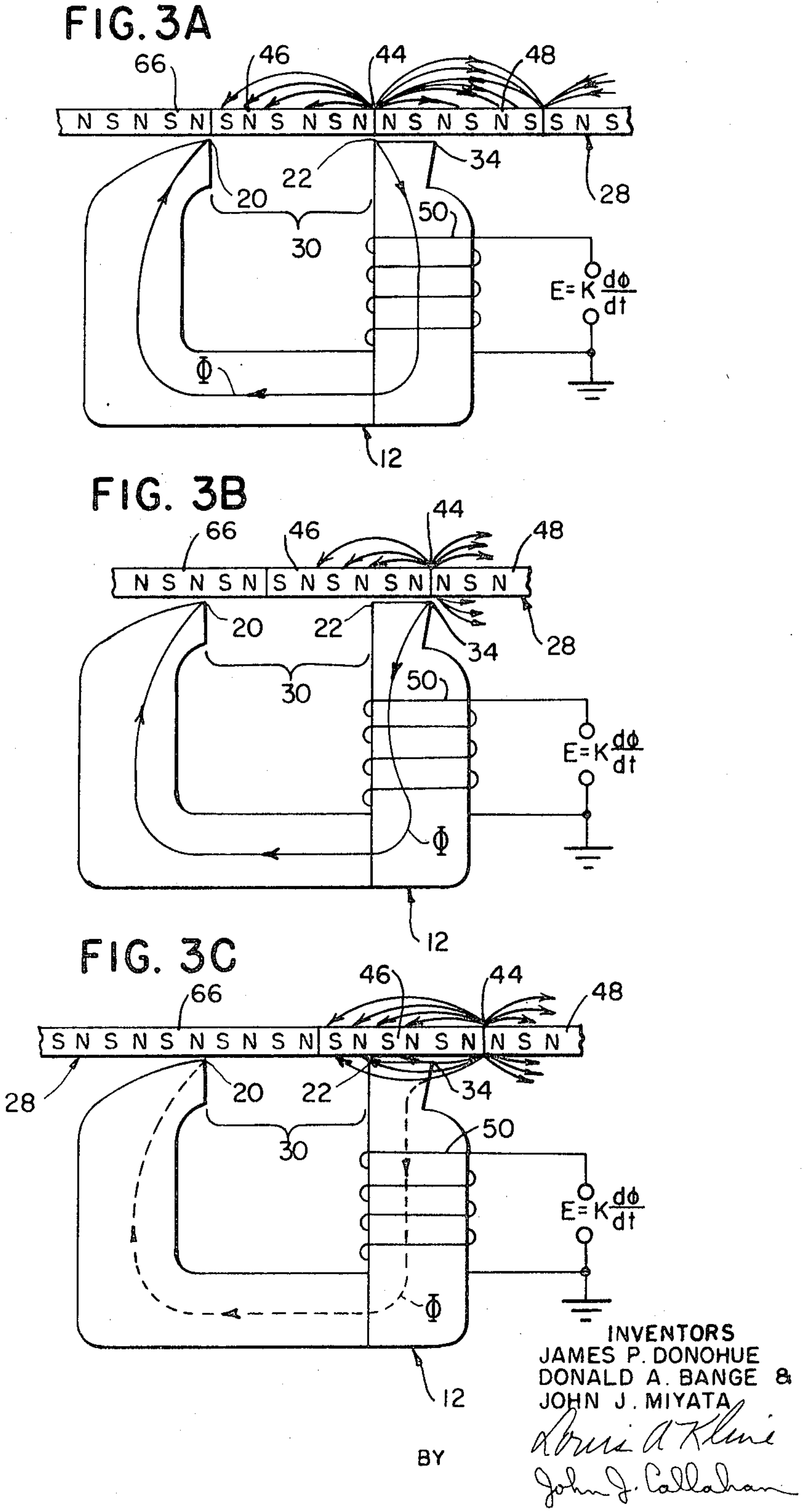
FIGS. 3A, 3B and 3C show the flux flow through the core element as the tape is moved along its given path.

Referring now to FIGS. 3A, 3B, and 3C, it is shown in more detail how reproduce pole tip 34 can determine whether a 1 bit or a 0 bit has been recorded at junction 44. FIG. 3 shows core element 12, tape 28 and reproduce coil 50 for three positions of tape 28 during the portion of the cycle tape 28 is moving. FIG. 3A shows the position of tape 28 just as it begins to move, that is when junction 44 is still directly over trailing pole tip 22; FIG. 3B shows the position of tape 28 when junction 44 is directly over reproduce pole tip 34; and FIG. 3C shows the position of junction 44 after it has moved to the right of reproduce tip 34. In FIGS. 3A, 3B and 3C, it has been assumed that the portion 66 of tape 28 which has not as yet passed over gap 30 has been premagnetized such that flux flows from right to left, that is with the north pole on the right and the south pole on the left. This may be accomplished by an erase head (not shown) associated with system 10. It is also assumed that while tape 28 was stationary, increment 46 was magnetized the same as portion 66, and that previously increment 48 was magnetized opposite to increment 46, that is with a north pole on the left and a south pole on the right. Thus, there is a pair of north poles at junction 44 and since flux flows from a north pole to a south pole, junction 44 will emit flux. Some of this flux emitted by junction 44 will flow to south poles in either increment 46 or portion 66 of tape 28 through the lowest reluctance path available.

In FIGS. 3A, 3B and 3C, there are two paths available and they are either through air or through core element 12. Since core element 12 has a much lower reluctance than air, the majority of the flux will flow through core element 12 along the path labeled Φ so long as junction 44 is between trailing pole tip 22 and reproduce pole tip 34. During this time, the flux intensity will remain relatively constant and thus the time derivative of the flux will be almost 0. Thus, the voltage at the output of reproduce coil 50 will be 0 since it equals some constant times this derivative. However, in FIG. 3C, tape 28 has moved so that junction 44 is no longer close to core element 12 and now the majority of the flux will flow through the air to different portions of increment 46 with only a small amount flowing through core element 12, as represented by the dashed line labeled Φ. When the the amount of flux in core element 12 drops, its time derivative will be some appreciable value, so the voltage at the output of reproduce coil 50 will also be some appreciable value. This value can be detected by circuit 52 and AND gate 54 (FIG. 1) if it occurs at the proper time and thus a 1 bit is recognized.

If a 0 bit had been recorded at junction 44, a negligible amount of flux would have flowed through core element 12 at all times since there would not be much flux emitted by junction 44. In this case, the absence of voltage at the output of reproduce coil 50 would indicate a 0 bit had been recorded. It should be noted that if junction 44 were a pair of south poles, also indicating a 1 bit, the operation would be the same except the flux would flow in the opposite direction.

Figure 2:
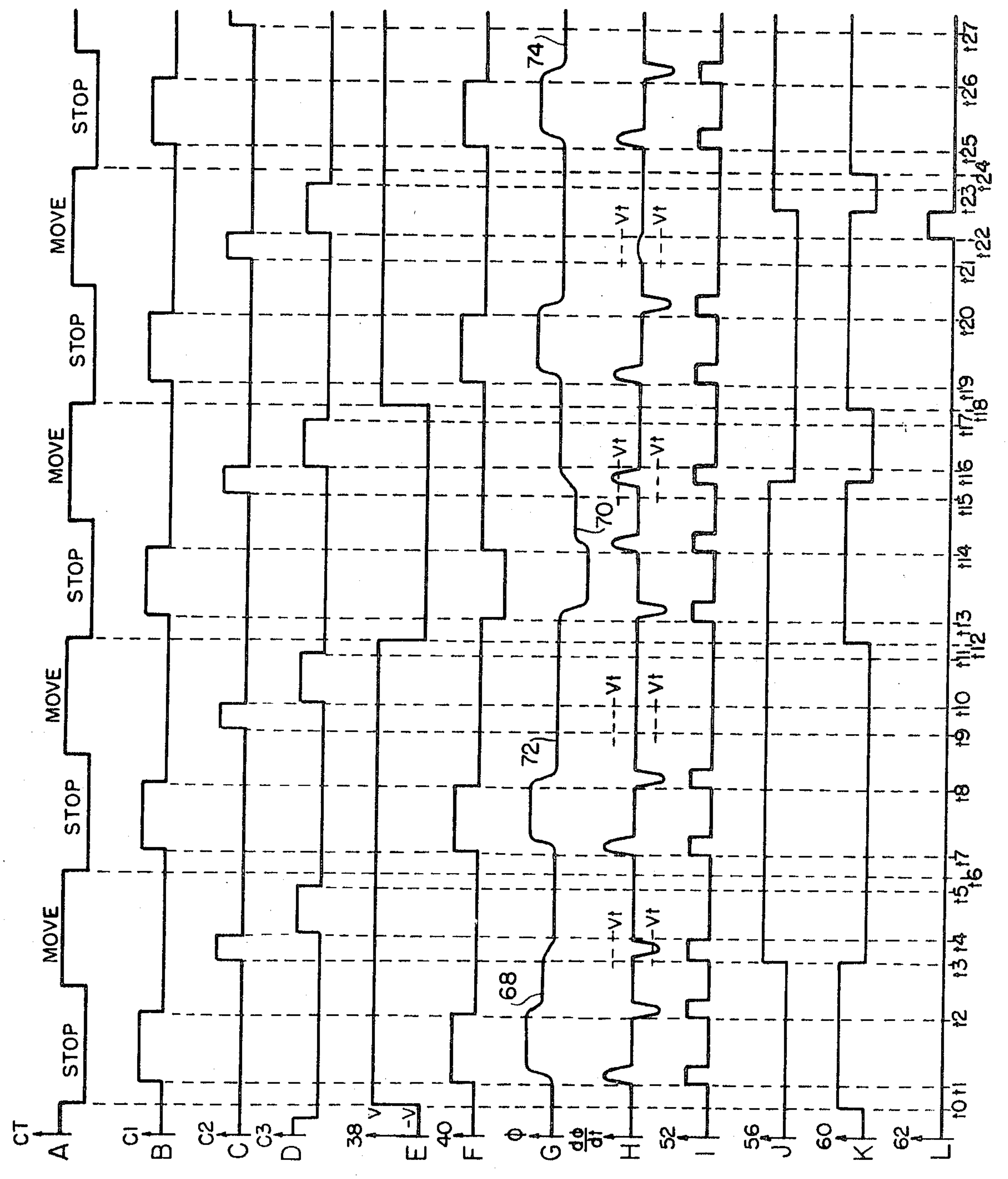
FIG. 2 shows several waveforms useful in understanding the operation of the first preferred embodiment.

Referring again to FIG. 2, there is shown several additional waveforms which are useful in understanding the exact operation of system 10. FIGS. 2A–2D as previously stated show the respective clock signals CT, C1, C2, and C3; FIGS. 2E and 2F respectively show the output signals from record means 38 and AND gate 40; FIGS. 2G and 2H respectively show the flux $\phi$ and its time derivative $d\phi/dt$ flowing in core element 12; and FIGS. 2I–2L respectively show the output signal from circuit 52, bistable multivibrator 56, EXCLUSIVE OR gate 60 and AND gate 62.

From FIG. 2G, it is seen that the flux $\phi$ in core element 12 has a high magnitude (which may be either direction) pulse between times $t_1$ and $t_2$, $t_7$ and $t_8$, $t_{13}$ and $t_{14}$, $t_{19}$ and $t_{20}$ and $t_{25}$ and $t_{26}$ since this is the time AND gate 40 is enabled by signal C1 and current is applied to record coil 36. After the C1 pulse becomes low, a flux of a smaller magnitude will remain in core element 12 if a 1 bit had been recorded on tape 28, such as between times $t_2$ and $t_3$ or $t_{14}$ and $t_{15}$ as seen at points 68 and 70 in FIG. 2G. If a 0 bit had been recorded, no flux would be in core element 12 due to tape 28 as seen at point 72 or 74 in FIG. 2G. Between times $t_3$ and $t_4$ and $t_{15}$ and $t_{16}$, tape 28 passes away from reproduce pole tip 34 and the flux drops to 0.

From FIGS. 2H and 2I, it is seen that a signal appears at the output of circuit 52 each time the flux changes magnitude. However, since AND gate 54 is only enabled during the $t_3$ to $t_4$ or the $t_{15}$ to $t_{16}$ time periods by a pulse from the C2 signal, only the circuit 52 pulses corresponding to the 1 bits are applied to bistable multivibrator 56. This pulse causes bistable multivibrator 56 to change states so that it assumes the state of record means 38. Thus, for the remainder of the cycle, or at least during the existence of a pulse from the C3 signal, the two inputs to EXCLUSIVE OR gate 60 will be the same and a low signal will be applied therefrom and through AND gate 62, thus indicating no error.

Reference is now made to times $t_{19}$ through $t_{22}$ in FIG. 2. It was desired here to record a 1 bit (the magnitude of the record means 38 signal changed polarity at time $t_{18}$) but because of an imperfection on the tape, a 0 bit was recorded, or at least would be read by the computer (not shown). Here, between times $t_{21}$ and $t_{22}$, no $d\phi/dt$ or circuit 52 pulse occurs to cause bistable multivibrator 56 to change states. Thus after time $t_{22}$, the bistable multivibrator 56 and record means 38 signals will have different polarities and a high signal will be provide by EXCLUSIVE OR gate 60 and AND gate 62, indicating an error as seen in FIG. 1. The leading edge of this error signal after being delayed by delay circuit 64, is applied to bistable multivibrator 56 and causes it to then change states and be prepared to test for the next bit to be recorded and checked.

Figure 4:
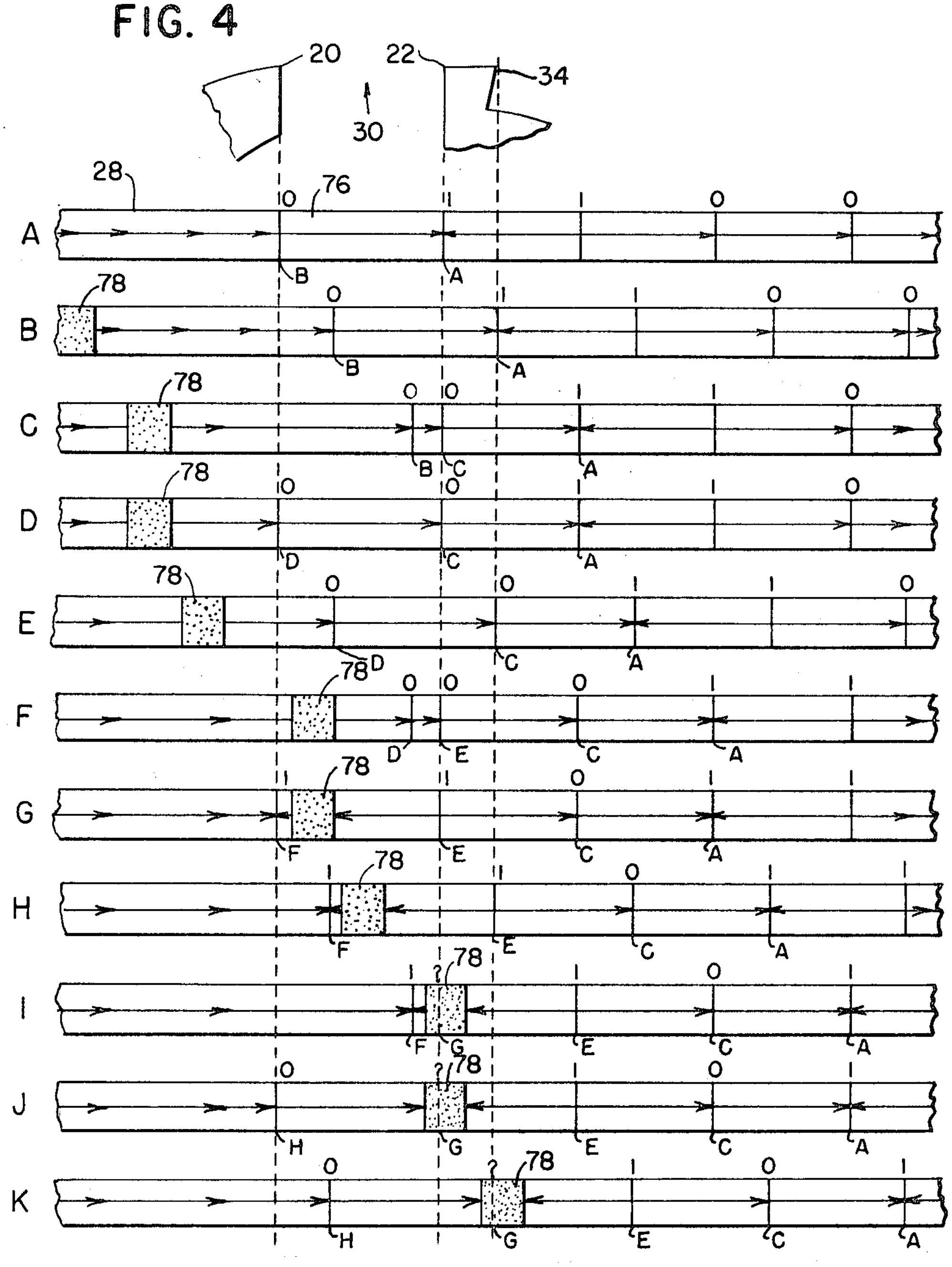
FIG. 4 shows several positions of the tape as it is moved over the head.

Reference is now made to FIG. 4 to show the advantages of system 10 over the prior art single gap head described previously. In FIG. 4, there are shown several of the positions tape 28 will have taken during the time required to record and reproduce four bits on tape 28. FIG. 4A shows the position of tape 28 as record means 38 is turned on so that the magnetic field in gap 30 causes a magnetic field to surround tape 28 in the direction shown by arrow 76. In FIG. 4, an arrow will represent the north and south poles with the south pole being at the arrow head, and the north pole being at the other end of the arrow, hereinafter referred to as the arrow tails. Thus, in FIG. 4A where two arrow heads are positioned together, at point "A", two south poles will exist, or as at point "B" where an arrow head and an arrow tail are together, a south and a north pole will respectively exist.

Soon after AND gate 40 is disabled and current ceases to flow in coil 36, tape 28 begins moving towards the right. FIG. 4B shows the position of tape 28 at the time point A is positioned directly over reproduce pole tip 30. The two south poles at point A would be sensed as a 1 bit as explained above with reference to FIG. 3. In the prior art single gap system, at the time point B left leading pole tip 20, a detecting means similar to reproduce coil 50 would have been gated on to detect any change in flux. In this case, where a south and a north pole exist at point B, no change in flux would occur. Thus, the prior art system would sense a 0 bit at point B where, in fact, a 1 bit had been recorded at point A. This, in turn, requires the prior art system to have complicated logic circuitry, which would have to include a memory that kept track of prior recordings on tape 28 in order to translate this sensed 0 bit into an actual 1 bit which is recorded.

Referring now to FIG. 4C, the situation is shown in which tape 28 has moved one complete incremental length and come to a complete stop. In this situation, it is seen that point B has not moved to a position directly above tailing pole tip 22; rather, a third point, C is now directly above trailing pole tip 22. Referring to FIG. 4D, the situation is shown after AND gate 40 has been enabled and caused the magnetic field to be applied across gap 30. This, in turn causes a magnetic field to exist in the increment between points C and D. It is seen here that the point B shown in FIGS. 4A, 4B and 4C, is now erased.

It will be remembered that the prior art system looked at point B as an indication of the bit which was written at point A. However, as seen from FIG. 4D, any signal which appeared at point B no longer exists. Thus, the prior art system is not actually checking to be sure the bit which was desired to be recorded on tape 28 was actually so recorded, but rather, is only obtaining an indication that it may have been so recorded. In FIGS. 4E, 4F and 4G, it is seen that the events which were shown by FIG. 4B, 4C and 4D are again repeated. Similarly, in FIGS. 4H, 4I, 4J and 4K, the events of FIGS. 4B, 4C, 4D and 4E are repeated. Thus, in FIG. 4K, bits should be occurring at the points marked A, C, E, and G.

Referring back to FIG. 4B, it is seen that an area 78 on tape 28 begins to move into view which cannot become magnetized. Such an area could be a speck of dust or an area where the iron oxide did not stick to the substrate of tape 28. Reference to FIGS. 4F and 4G shows that now the area of nonmagnetism 78 has moved within gap 30, although it is not covering the points E or F in FIG. 4G at the time the magnetic field is applied. FIG. 4H shows the situation after the tape has begun to move. In this case, the prior art system would have sensed a change in flux at point F in FIG. 3H, which would have indicated the valid bit at point E.

As the tape continues to proceed as shown by FIGS. 4I and 4J, it is seen that from FIG. 4J that when the next bit that is to be produced at point G will fall directly within the area of nonmagnetism 78. Referring now to FIG. 4K, as point G moves across reproduce pole tip 34, there will not be a large change in flux flow through element 12 during the time AND gate 54 is enabled because point G is in the area of nonmagnetism 78. It should be noted that the prior art system would have checked point H in FIG. 4K and given an indication that a valid bit existed at point G, when, in fact, no valid bit exists there. Thus, system 10 will check a recorded bit prior to recording a new bit, and check the actual bit recorded and not some indication of it.

What is claimed is:

1. A magnetic head core element comprising:
a member having a first and a second pole tip, there being a low-reluctance path connecting said first and said second pole tips, said first and said second pole tips being separated by a given distance, such that a high-reluctance gap is formed between said first and second pole tips;
said member further having a third pole tip which is coupled by said low-reluctance path to said first and second pole tips, said second and third pole tips being separated from one another by less than said given distance;
said third pole tip being capable of sensing any change in a magnetic field existing in the vicinity thereof.

2. The invention according to claim 1 wherein said third pole tip senses any directional change in a magnetic field existing in the vicinity thereof by causing a change in magnitude of the flux flowing in said low-reluctance path coupling said first and third pole tips due to the existence of said magnetic field.

3. A magnetic recording and reproducing head for recording on and reading from a passing medium comprising:
a magnetic core structure which includes first and second pole tips separated by a nonmagnetic gap and a third pole tip, said first, second, and third pole tips being arranged so that any point on said medium passes said first pole tip before passing second pole tip and passes said second pole tip before passing said third pole tip;
first means responsive to a signal applied thereto for causing a first magnetic field to exist in said gap to thereby cause a magnetic field to exist on said medium between a first and a second point of said medium, said second point being a function of the position of said medium with respect to said second pole tip at the time said magnetic field exists in said gap; and
second means responsive to the existence of any change in the magnetic field of said second point passing in the vicinity of said third pole tip for providing a signal indicative of a change in the magnetic field of said medium at said second point.

4. The invention according to claim 3 wherein said head is capable of causing to exist on a medium which is capable of being magnetized and which is passed in the vicinity of said head, a plurality of incremental magnetic fields, each one of which exists along a unique incremental length of said medium, each of said fields being capable of having one of two directions.

5. The invention according to claim 4: wherein each of said incremental lengths have a given distance; and wherein the distance separating said first and second pole tips is greater than said given distance and less than twice said given distance.

6. The invention according to claim 4:
wherein each of said incremental lengths have a given distance; and
wherein the distance separating said second pole tip and said third pole tip is a certain distance plus a fixed whole number multiple, including zero, of said given distance.

7. The invention according to claim 6 wherein said distance separating said second pole tip and said third pole tip is a certain distance which is less than said given distance.

8. The invention according to claim 3:
wherein said core structure further includes a low-reluctance path connecting said first, second, and third pole tips;
wherein said first means includes a first coil wound on said path such that whenever a voltage is applied across said first coil, a flux is induced in said path which causes said first field to exist;
wherein said second means includes a second coil wound on said path; and
wherein whenever said second magnetic field exists in the vicinity of said third pole tip, a second flux is caused to flow through said path, said second flux being dependent upon the intensity and direction of said second magnetic field, said second flux causing a voltage to appear across said second coil which is proportional to the time rate of change of said second flux.

9. The invention according to claim 8:
wherein said first means further includes means to cause said first voltage to be selectively applied across said first coil and further to cause said first voltage to have one value during one application to said first coil and a different value during another application to said coil; and
wherein said second means further includes means for selectively sensing the voltage across said second coil during the time when there is no voltage applied to said first coil.

10. In a magnetic recording and reproducing system which includes a magnetic head having a nearly closed loop low-reluctance path separated by a narrow gap, said gap separating a leading pole tip from a trailing pole tip; means for causing a medium capable of being magnetized to pass in the vicinity of said gap in a direction form said leading pole tip to said trailing pole tip; bit recording means, including a first winding positioned on said low-reluctance path, which in response to intermittently occurring voltage pulses applied to said first winding causes a magnetic fields to exist in said gap during the occurrance of each of said voltage pulses, said pulses occurring in accordance with a given binary code which is to be recorded on said medium, wherein adjacent increments of said medium become magnetized as said medium passes in the vicinity of said gap; the direction of the field in each of said increments being determined by said magnetic fields caused to exist in said gap such that certain of the junctions of adjacent ones of said adjacent ones of said increments have opposite magnetic poles; an improvement comprising:

a reproducing pole tip positioned a fixed distance away from said trailing pole tip on said low-reluctance path such that any point on said medium passes in the vicinity of said reproducing pole tip after it has passed in the vicinity of said trailing pole tip; and bit reproducing means, including a second winding positioned on said low-reluctance path, for providing a signal indicative of any flux change in said low-reluctance path resulting from one of said certain increment junctions passing in the vicinity of said reproducing pole tip.

* * * * *